J. R. WILLIAMS,
Assignor, by mesne assignments, to CAMBRIA IRON CO.
Manufacture of Horseshoe-Blanks.
No. 9,111. Reissued Mar. 9, 1880.
Fig 1,
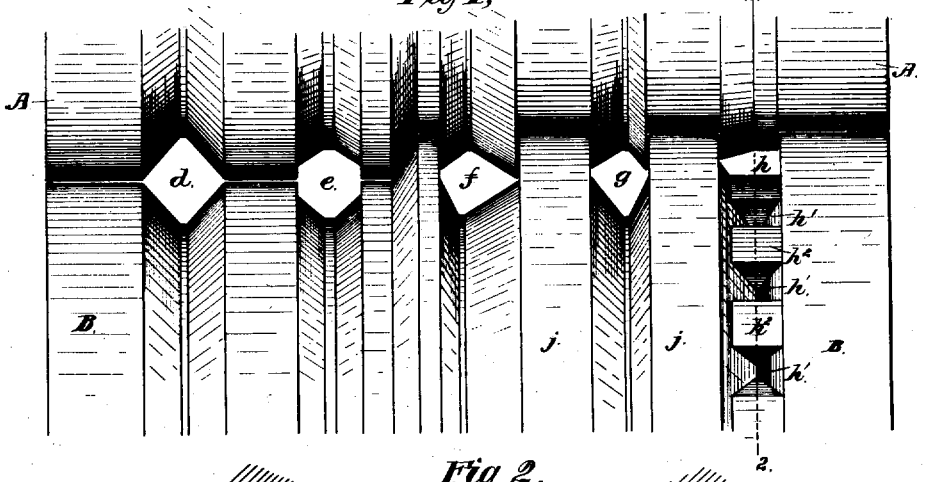
Fig 2,
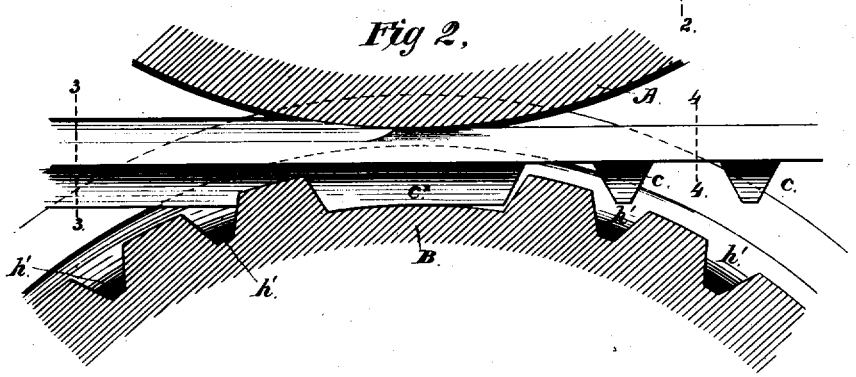
Fig 3, Fig 5, Fig 4,
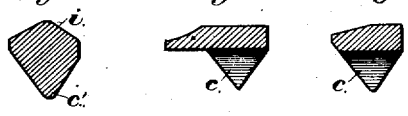
Fig 6,
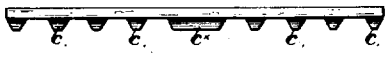
Attest:
Geo. T. Smallwood Jr
Walter Allen
Inventor:
John R. Williams
By Knight Bros
Attys.

UNITED STATES PATENT OFFICE.

JOHN R. WILLIAMS, OF JOHNSTOWN, PENNSYLVANIA, ASSIGNOR, BY MESNE ASSIGNMENTS, TO CAMBRIA IRON COMPANY, OF SAME PLACE.

MANUFACTURE OF HORSESHOE-BLANKS.

SPECIFICATION forming part of Reissued Letters Patent No. 9,111, dated March 9, 1880.

Original No. 182,732, dated September 26, 1876. Application for reissue filed December 15, 1879.

*To all whom it may concern:*

Be it known that I, JOHN R. WILLIAMS, of Johnstown, in the county of Cambria and State of Pennsylvania, have invented certain new and useful Improvements in the Manufacture of Blanks for Horseshoes, of which the following is a specification.

The object of my invention is to produce, by rolling, a bar with V-shaped or other tapering projections formed in one piece with the said bar, so as to adapt it to be cut up into blanks, from which calked horseshoes may be made by machinery without welding.

To this end my invention consists, in part, in a certain construction and formation of rolls adapted to produce the required calked bar by successive passes, as hereinafter described; also, in the method of manufacturing bars for horseshoes by rolling a rectangular bar through successive grooves in the rolls, and then finishing the same by passing the bar through a groove having pockets for the formation of the required calks; and, finally, in a rolled bar of peculiar construction, as hereinafter described.

To obtain, by rolling, a desired form of bar, it is necessary, first, to lay out the groove which is to give the finished form. This is, of course, easily done, as the finishing-groove must correspond in size and shape with the section of the required bar. Consequently no especial ingenuity is required to construct a finishing-groove for any simple form of bar which can be rolled; but ingenuity may be demanded in the production of a preliminary bar or billet of suitable shape or section to adapt it to be taken by the finishing-groove and delivered in the shape required without, on the one hand, failing to completely fill any of the less accessible parts of the said finishing-groove, or, on the other hand, overfilling said groove, so as to produce fins or other projections or inequalities, which would impair the symmetry of the bar or necessitate a subsequent operation to finish it.

In many instances a number of preliminary grooves are required to produce a billet or preliminary bar of proper form to adapt it to pass through the finishing-groove with the desired effect.

An essential peculiarity in my preliminary bar adapted for the final pass through the finishing-groove consists in the formation of such bar by its passage through the last one or two preliminary grooves with a V-shaped lower edge, out of which the desired V-shaped calks may be formed, and a back having a protuberant ridge on which may be applied the necessary pressure to force the metal of the lower edge effectively down into the calk-pockets of the finishing-groove, so as to completely fill the same, and at the same time to completely fill the upper corners of the groove without such spreading of the upper part or back of the bar as to cause overfilling or produce fins.

In the accompanying drawings, which form a part of this specification, Figure 1 is a front elevation of the adjacent parts of a pair of rolls adapted to carry out my invention. Fig. 2 is a transverse section of the same on the line 2 2, Fig. 1. Fig. 3 is a transverse section of the preliminary bar previous to its passage through the finishing-groove, as, for example, on the line 3 3, Fig. 2. Fig. 4 is a transverse section of the finished bar on the line 4 4, Fig. 2. Fig. 5 is a transverse section of a bar, illustrating my invention in modified form, and adapted for the production of large and heavy shoes. Fig. 6 is an elevation, on a smaller scale, of a horseshoe-blank, such as are produced by cutting up my calked blank-bar.

A B represent a pair of rolls, which in practice are geared together so as to rotate in unison in customary manner. They are constructed with a series of grooves, of which I have shown, for illustration, five, marked respectively *d*, *e*, *f*, *g*, and *h*. In the shape of the first groove, *d*, there is no essential peculiarity. The bar comes from it with an approximately rectangular section. The next groove, *e*, is so made that it will change the square bar to the peculiar shape shown by said groove, half of which is cut into each roll. This groove, while it elongates and reduces the bar, so shapes it that it will readily enter the next groove, *f*, which, in turn, prepares it for the next groove, *g*. To this it goes by turning one-quarter over. From this groove it comes with the section shown in Fig. 3, having an angular or V-shaped lower edge, *c'*, out of which the calks *c* and $c^{\times}$ are to be formed, and a back having a protuberant ridge or upper surface, *i*, which in the final pass through the finishing-groove *h* sustains the heavy pressure necessary to completely fill the pockets *h'* out of the metal of the V-edge *c'*, and insures the complete filling out of the rectangular upper corner of said finishing-groove *h* without overfilling.

From the foregoing description it will appear that the success of my invention depends largely on the effect of the peculiar forming-grooves *e f g*. I could not produce a calked horseshoe in merchantable condition—to wit, with clearly-defined calks well filled out and with no fins thrown out on the bar between the calks—where there is so great a reduction as is necessary to produce them if the grooves *e f g* left the bar with a square top. The pressure required to displace the metal between the calks and force it into the upper portions of the finished bar would throw up fins on the top of the bar between the calks; but by forming the bar with a protuberant and ridge-shaped upper surface I am enabled to roll it into the required form without any fins, and there will be enough pressure on the ridge-shaped top to force the V-shaped part down into the pockets and flatten the top of the bar so as to just fill out the corners.

The final groove *h*, by means of pockets *h'* and intervening prominences $h^2$, produces on the bar the desired number of calks *c c* and longer ridges $c^{\times}$, which form the toe-calks of the finished shoe.

The rolls may have a circumference and an adequate number of depressions to run the length of two or more blanks at each revolution, and the bars are, of course, rolled of a length to be cut up into any number of blanks. The last two or three grooves of the rolls are formed, as shown, between collars on the upper roll and depressions in the periphery of the lower roll, so that the blanks are turned out with little or no fins.

The catch-plates are made to bear on two or more collars, *j j*, of the lower roll, or else, if adapted to single grooves, they are made to fit around the periphery of the lower roll to a sufficient distance to prevent their dropping into the pockets *h'*.

The rolls shown in Fig. 1 are adapted to produce the bar illustrated in Fig. 4. Fig. 6 shows so much of the bar as goes to make a complete blank.

The modification in the form of grooves necessary to produce the blank for larger shoes (illustrated in Fig. 5) will be readily understood by the skilled manufacturer.

The blanks are finally formed into horseshoes by bending them in the required shape, stamping between dies, which I have described in my patent dated 26th September, 1876, No. 182,731, and subsequently punching the nail-holes.

I am aware that straight blanks with calks of various forms prepared for bending into the shape of a horseshoe have before been made. This, therefore, I do not broadly claim.

My rolled bars for the manufacture of horseshoes are peculiar, in that they are constructed in continuous lengths with projections *c*, V-shaped in cross-section, arranged in sets or series of any desirable number in each, with longitudinal ridges $c^{\times}$ intervening between the sets of V-shaped projections, for the purpose of forming the toe-calk of the finished shoes, the bar thus formed being adapted to be cut into blanks, as before described.

Having thus described my invention, the following is what I claim as new therein, and desire to secure by Letters Patent:

1. The rolls A B, constructed with one or more preliminary grooves, *e f g*, to produce a bar with V-shaped edge and ridge-shaped back and with a pocketed finishing-groove, *h*, for the production of calked horseshoe-bars.

2. The method of manufacturing bars for horseshoes herein described, consisting in rolling a rectangular bar through the successive grooves to the form shown in Fig. 3, and then finishing the same by passing the bar through groove *h*, provided with pockets, as and for the purpose set forth.

3. The rolled bar having two or more sets or series of V-shaped projections, *c*, and interposed longitudinal ridges $c^{\times}$, substantially as herein described, and adapted to be cut up into blanks for horseshoes.

JOHN R. WILLIAMS.

Witnesses:
CYRUS ELDER,
ROBERT P. FIELD.